United States Patent

[11] 3,603,679

[72] Inventor James F. Davis
  17154 Nordhoff St., Northridge, Calif. 91324
[21] Appl. No. 751,551
[22] Filed Aug. 9, 1968
[45] Patented Sept. 7, 1971

[54] PROGRESSIVELY ILLUMINATED SIGNS
  4 Claims, 5 Drawing Figs.
[52] U.S. Cl. .................................................. 353/75, 353/93
[51] Int. Cl. .................................................. G03b 21/22, G03b 21/14
[50] Field of Search .................................. 353/97, 75, 76, 77, 78, 88, 93; 350/266, 273, 275; 40/110, 161, 162

[56] References Cited
UNITED STATES PATENTS
1,238,882  9/1917  Buhlmann ..................... 353/93
2,286,322  6/1942  Warriner ...................... 353/88
2,996,952  8/1961  Orlando ....................... 350/266
3,301,128  1/1967  Brandt .......................... 353/78
3,472,588  10/1969  Pine .............................. 353/78

Primary Examiner—Leonard Forman
Assistant Examiner—A. J. Mirabito
Attorney—Edward D. O'Brien ABSTRACT: Illuminated signs are disclosed. Each of these signs has a viewing screen located with respect to a projector so that any of a series of different film or transparency frames may be projected on the screen by the projector so as to be capable of being viewed from the front of the screen. In each of these signs a shutter is continuously moved so as to control whether all or a portion of the projected image can be viewed on the screen. Means are provided for periodically projecting a different film frame in accordance with the shutter operation.

PATENTED SEP 7 1971

INVENTOR
JAMES F. DAVIS
BY
EDWARD D. O'BRIAN
ATTORNEY

INVENTOR
JAMES F. DAVIS
BY
EDWARD D. O'BRIAN
ATTORNEY

PROGRESSIVELY ILLUMINATED SIGNS

BACKGROUND OF THE INVENTION DRAWINGS

The present invention pertains to the field of progressive signs. Such signs are commonly used for advertising purposes, although they are capable of being used for other somewhat different purposes.

It is commonly recognized that to be effective an advertising sign should be of such a character as to readily attract attention. Many of such signs are of a "fixed" character in that they have only a single, unchangeable advertising message which can be viewed. Frequently such a "fixed" sign will contain a picture or illustration designed to attract attention to the message per se. Because of the inherent nature of such signs of a "fixed" character normally an individual will only give them a passing attention. This limits the effectiveness of such a sign for advertising purposes.

This has resulted in the development of various different types of signs which continuously change. It is considered that the motion or action involved in such a change effectively tends to attract the attention of an individual so that instead of merely glancing at a sign a person will tend to look at it for a longer period than he or she would look at a "fixed" type of sign. A large variety of different types of movable or changeable signs have, of course, been developed and to various extents used.

In the past various efforts have been directed toward providing movable or changeable signs which not only contained an advertising message but also contained an image or picture which would tend to attract an individual's attention. Such signs while undoubtedly to a degree effective are not considered to be as effective as possible because of the nature of their constructions and the manners in which a picture and a text message are used together in conjunction with such signs.

SUMMARY OF THE INVENTION

An object of the present invention is to provide new and improved illuminated signs which are much more desirable for commercial purposes than various prior related signs such as are briefly indicated in the preceding discussion. Another objective of this invention is to provide illuminated signs of a so-called progressive category in which various different images are sequentially displayed and in which at the same time may be display different advertising texts. A further objective of this invention is to provide advertising signs of the type indicated which are relatively inexpensive, which may be constructed without difficulty at a nominal cost, which give prolonged effective performance and which because of their construction may be easily and conveniently serviced whenever required.

These and various other objectives of this invention are achieved in accordance with this invention by providing illuminated signs, each of which includes a viewing screen adapted to have an image projected on it. A projector means such as a common slide or film projector is located so as to be spaced from this screen. Optical means are provided in conjunction with such a projector means for projecting an image from an individual film frame such as a frame on a continuous strip of film or on a slide onto the viewing screen. Shutter means are also provided for periodically interrupting at least a part of the projected image projected by the projector means so that such part cannot be viewed on the viewing screen. Cooperating actuating means on and adjacent to the shutter means in such a sign periodically cause the projector means to project different of the film frames used onto the projector screen.

BRIEF DESCRIPTION OF THE DRAWINGS:

The actual details of this invention as well as many advantages of it will be apparent from a detailed consideration of the remainder of this specification, the appended claims, and the accompanying drawings in which:

Those skilled in the art of advertising signs will realize from a review of the accompanying drawings in conjunction with the remainder of this specification that the basic features or principles of this invention may be embodied within other differently constructed and differently appearing advertising signs through the use or exercise of routine engineering skill or ability.

SUMMARY OF THE INVENTION

Figure 1:
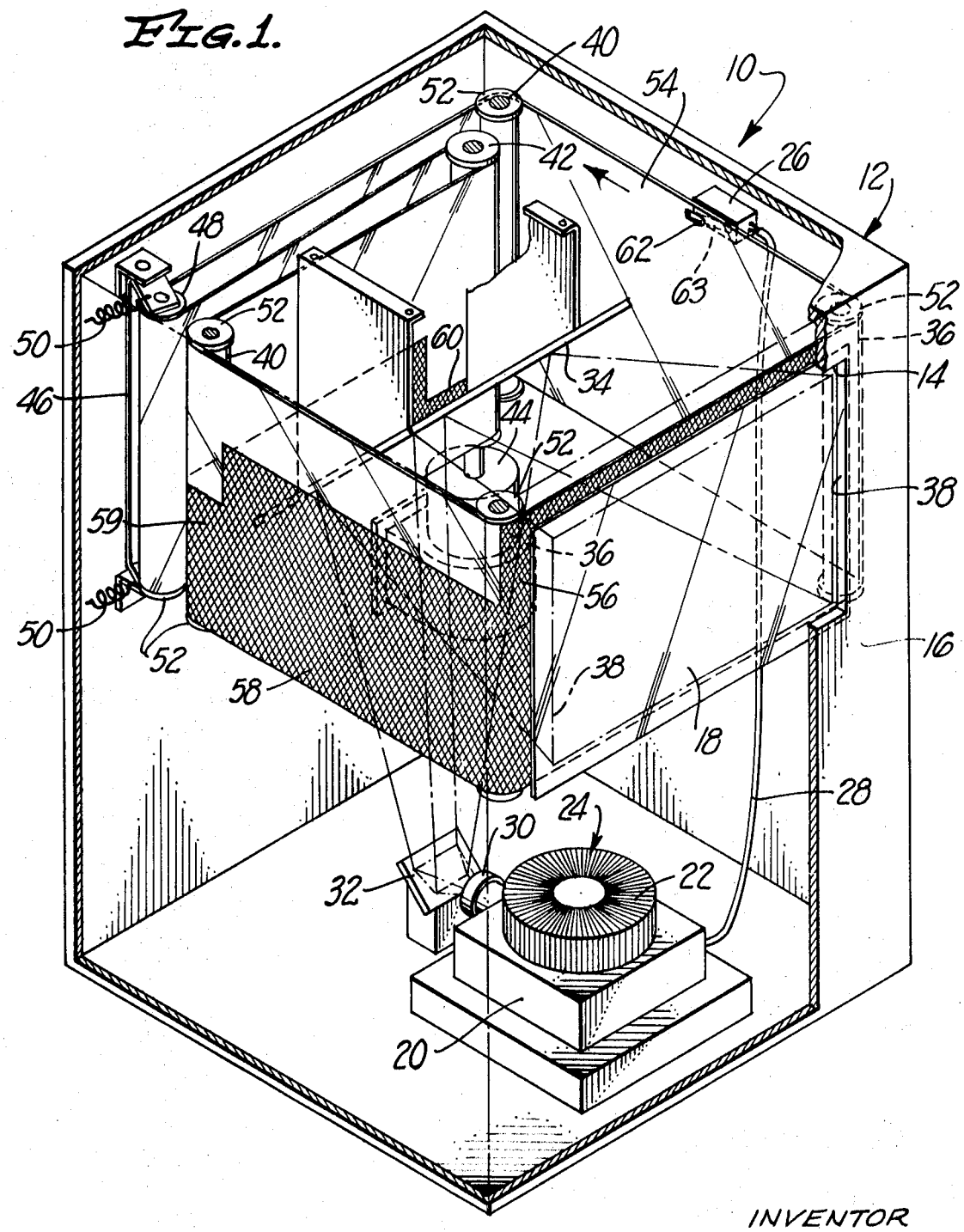
FIG. 1 is an isometric view, partially broken away, showing the construction of an illuminated sign of this invention.

In FIG. 1 of the drawing there is shown an illuminated sign 10 of this invention of a so-called progressive character. This sign 10 includes a housing 12 having an opening 14 in its front side 16. An image or viewing screen 18 is mounted on this housing 12 so as to extend across this entire opening 14. The screen 18 is of a known type which will enable an image projected on its back surface to be viewed at its front.

A conventional projector 20 is located within the housing 12 so as to be spaced from the screen 18. The projector 20 illustrated in FIG. 1 of the drawing is of a conventional type capable of projecting any of a series of slides 22 held on a magazine 24 on it and of sequentially projecting different of its slides 22 held by the magazine 24 when a control signal is fed to this projector 20 from a switch 26 through a conventional wire 28.

When a particular slide 22 is in a projecting position within the projector 20 the image from such a slide 22 is conveyed by what may be termed "optical means" to the surface of the screen 18 facing the interior of the housing 12. In the structure shown such "optical means" include a lens system 30 mounted on and forming a part of the projector 20 and two different mirrors, 32 and 34, mounted at angles with respect to one another so as to transmit an image projected from the projector 20 through the lens system 30 to the surface of the screen 18 facing the interior of the housing 12.

In the sign 10 parallel rollers 36 are mounted on the housing 12 adjacent to and spaced from opposed edges 38 of the opening 14. Other similar rollers 40 are mounted on this housing 12 back of the mirror 34. Also a drive roller 42 is mounted on the housing 12 back of the mirror 34. This drive roller 42 is connected to a conventional electric drive motor 44. A bracket 46 is also located upon the housing 12 adjacent to one of the rollers 40. This bracket 46 carries a tension roller 48 and is biased as shown toward a corner of the housing 12 by means of springs 50. All of the rollers described are located parallel to one another and are preferably provided with end flanges 52.

This series of rollers is intended to support transparent endless belt 54 serving as a shutter so that this belt 54 may be moved from left to right past the surface of screen 18 facing the interior of the housing 12 during the operation of motor 44. It will be noted that the belt 54 extends in a more or less labyrinth type of path around all of the various rollers described. It will also be noted that this belt 54 is provided with an opaque area 56 which extends across the belt 54 and which is preferably about twice the linear width of opening 14 and with continuous, stepped opaque areas 58, 59 and 60 which extend partially across the width of the belt 54 and which are approximately equal to the width of opening 14 for each step. Other than these opaque areas of the belt 54 are transparent to light.

It will also be noted that the belt 54 is provided with a small opening 62 located adjacent to an edge of it adjacent to the leading vertical edge of opaque area 56 on belt 54. This opening 62 is located so as to be capable of being engaged by a spring biased by an actuating arm 63 of the switch 26 each time the belt 54 has moved past a single point on its path of travel.

During the operation of the sign 10, power is supplied to the projector 20 and to the motor 44. This causes the projector 20 to project the image on the film or transparency on a single one of the slides 22 so that such an image is projected upon the screen 18 when completely transparent areas of belt 54 permit this passage of light to screen 18. Thus such an image may be viewed from the front of housing 12. The belt 54 is continuously moved through the operation of the motor 44 as the entire sign 10 is operated. The opening 62 is preferably located so that when the opaque area 56 of the belt 54 blacks out the viewing screen 18 the switch 26 is actuated by the arm 63 engaging this opening. This in turn actuates the projector 20 so that the next successive slide within the series of slides in the magazine 24 will be projected toward the screen 18 during the interval when this screen 18 is blanked out because of the position of the area 56 on the belt 54.

As the trailing vertical edge of opaque area 56 moves across the screen 18, that part of the image not blocked by contiguous first-stepped opaque area 58 is projected on screen 18. As this area 58 and subsequent-stepped opaque areas 59 and 60 are moved so as to shield the screen, the effect is that the image being projected on screen 18 is progressively wiped on. The total image then appears on the screen 18 as the clear portion of belt 54 passes with respect to the face of screen 18. The clear or transparent portion of the belt 54 is preferably at least three times the width of opening 14. Then as the leading edge of the area 56 moves across the screen 18, the whole projected image is progressively wiped off and during this interval when no projected image is visible another slide is positioned and projected and the progressive wiping-on and wiping-off cycle is repeated.

This wiping-on and wiping-off effect is considered advantageous from an attention-getting viewpoint. It creates the illusion of animation in an otherwise static projected image. With the particular sign 10 various individual portions of the image will be blocked from view as a part of such wiping action. Such portions of the image may correspond to portions of an advertising message located in areas of a slide 22 corresponding to the areas blocked off on the screen by areas 58, 59 and 60 of belt 54. The ability to display progressively and in reading order a message contained on an individual slide 22 is considered to be an important aspect of the complete sign 10. It will be realized that the opaque areas 56, 58, 59 and 60 on the belt 54 can be varied or changed as desired for a particular application. It will also be realized that transparent areas of different types can be located in these opaque areas.

Figure 2:
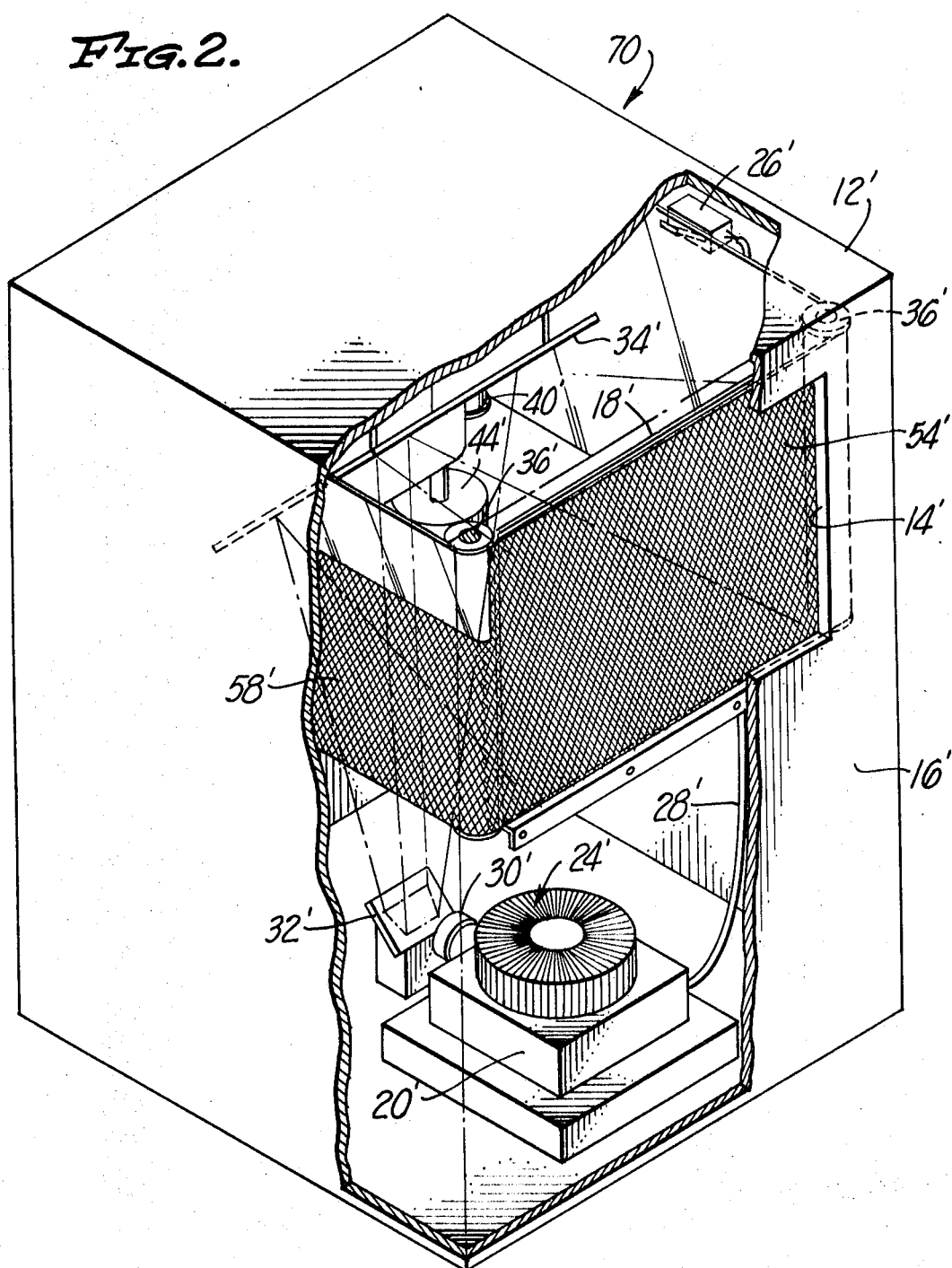
FIG. 2 is an isometric view, partially broken away, showing the construction of a modified illuminated sign of this invention.

In FIG. 2 of the drawing there is shown a modified advertising sign 70 of the present invention which is exceedingly similar to the sign 10. All of the parts of the sign 70 directly correspond to various parts of the sign 10 and operate in the same manner as these parts. For this reason all of the parts of the sign 70 are designated by the primes of the numerals previously used to designate various parts of the sign 10.

The sign 70 differs from the sign 10 in that the belt 54' passes around rollers 36' which are mounted so that this belt 54' extends in front of the screen 18' across the opening 14'. This screen 18' is mounted on the housing 12', but is mounted in such a way as to permit the belt 54' to be located in this manner.

Figure 3:
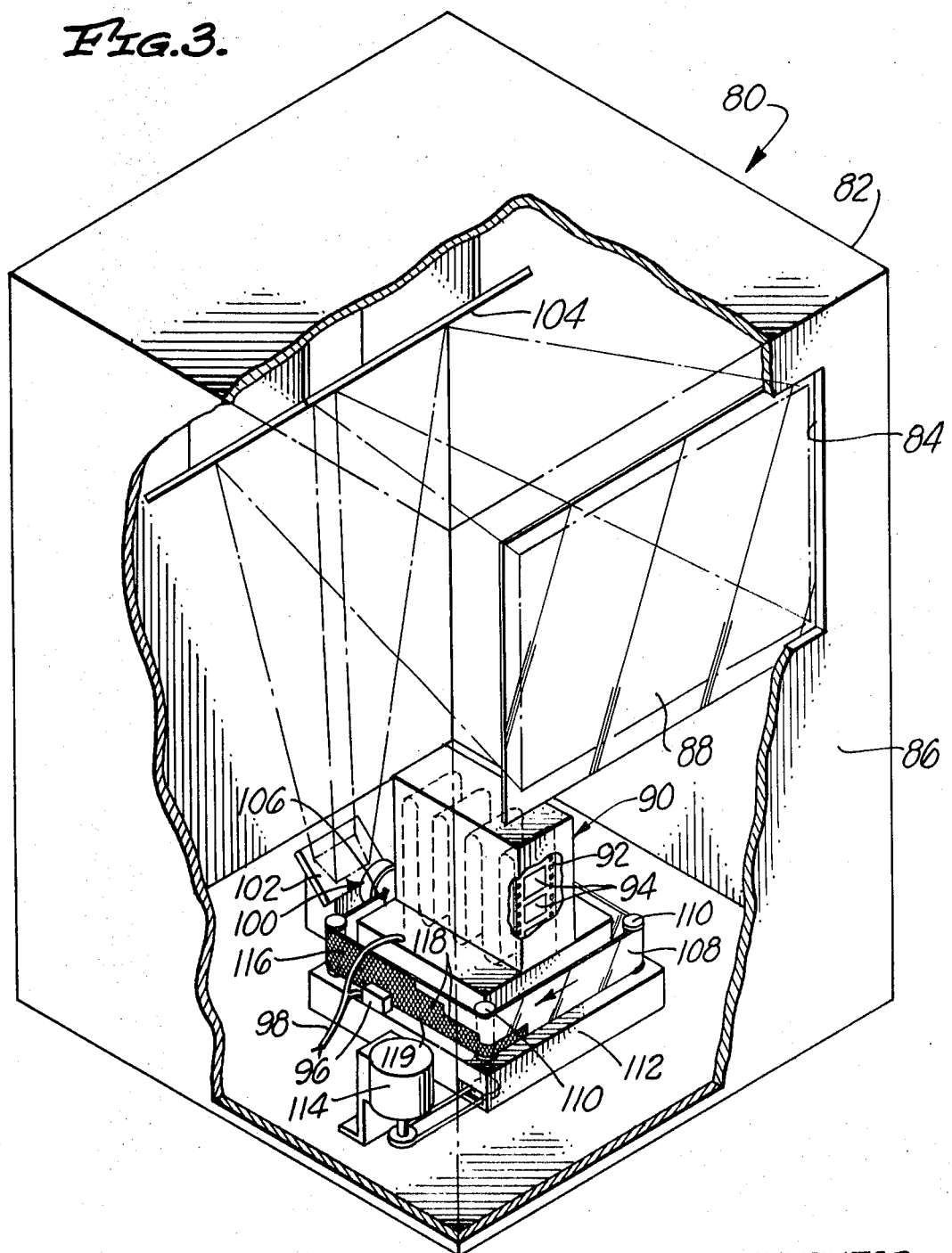
FIG. 3 is an isometric view, partially broken away, showing the construction of a further modified illuminated sign of this invention.

In FIG. 3 of the drawing there is shown a further modified sign 80 of this invention which is also exceedingly similar to the sign 10. It utilizes a housing 82 having an opening 84 in its front side 86. A screen 88 corresponding to the screen 18 is located on this opening 84. A projector 90 corresponding to the projector 20 is located within the housing 82 so as to be spaced from the screen 88. Although this projector 90 shown here is of a type utilizing a continuous loop of film 92 having individual film frames 94 located on it, it is also of a known type. It is adapted to advance for projection successive of the frames 94 when a conventional switch 96 connected to the projector 90 by a wire 98 is actuated.

In the sign 80 an optical means as previously described including a lens system 100 and mirrors 102 and 104 corresponding to the lens system 30 and the mirrors 32 and 34 are employed. This lens system 100, however, is constructed so as to include an opening 106 dividing it into sections, each of which is used for projection purposes. An endless transparent belt 108 corresponding to the belt 54 traverses this opening 106. This particular belt 108 is carried by sprockets 110 which are rotatably mounted on a subbase 112 used to support the projector 90. A conventional drive motor 114 is connected to one of the sprockets 110. Although it is not considered necessary with this embodiment of the invention, a tension roller such as the roller 48 used upon a movable bracket may be used in conjunction with it. The belt 108 contains areas 116 and 118 corresponding to the areas 56, 58, 59 and 60 previously described and an opening 119 corresponding to the opening 62 previously described for the purpose of actuating the switch 96.

The operation of the sign 80 is essentially the same as the operation of the sign 10. For this reason it is not considered necessary to describe its operation in detail herein. The sign 80 is considered preferable for some purposes because the belt mechanism employed with it is much smaller than the belt mechanism employed with the signs 10 and 70 previously described.

Figure 4:
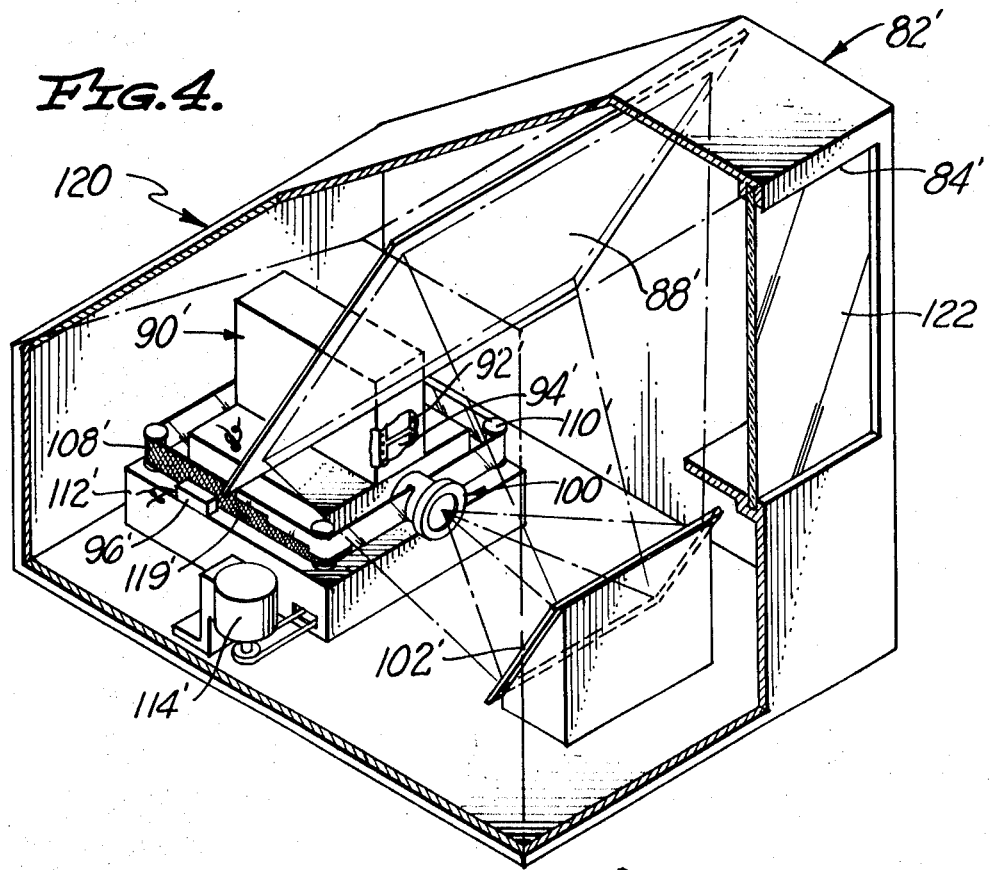
FIG. 4 is an isometric view, partially broken away, showing the construction of a still further modified illuminated sign of this invention.

In FIG. 4 of the drawing there is illustrated a further modified sign 120 of this invention. This sign 120 is exceedingly similar to the sign 80. For this reason all parts of the sign 120 which directly correspond to various parts of the sign 80 are not separately described herein, and in the remainder of this specification and in the drawings are designated by the primes of the numerals used to describe these parts in connection with the sign 80.

The sign 120 uses a housing 82'. Within this housing 82' is an opening 84'. The screen 88' is of a conventional front projection type and is located within this housing 82' so as to be capable of being viewed through this opening 84'. If desired this opening may be covered with a sheet 122 of a transparent material such as glass to prevent the accumulation of dust within the housing 82'.

A projector 90' is located within this housing 82' so that frames 94' of the film loop 92' are projected during the operation of this projector upon a mirror 102' so as to be reflected upon the screen 88'. The image from frame 94' so reflected can, of course, be viewed through the opening 84'. With this construction the mirror 104 used with the sign 80 is not needed and is therefore not used.

Except as specifically indicated in the preceding, the optical means or structure used with the sign 120 is identical with that employed in the sign 80. Similarly, the belt 108' in the sign 120 is employed as the belt 108 in the sign 80. As the sign 120 is operated the belt 108' is wound so as to block out all and later portions of a projected image and so as to cause a periodic change in such an image as previously described in conjunction with other embodiments of this invention.

Figure 5:
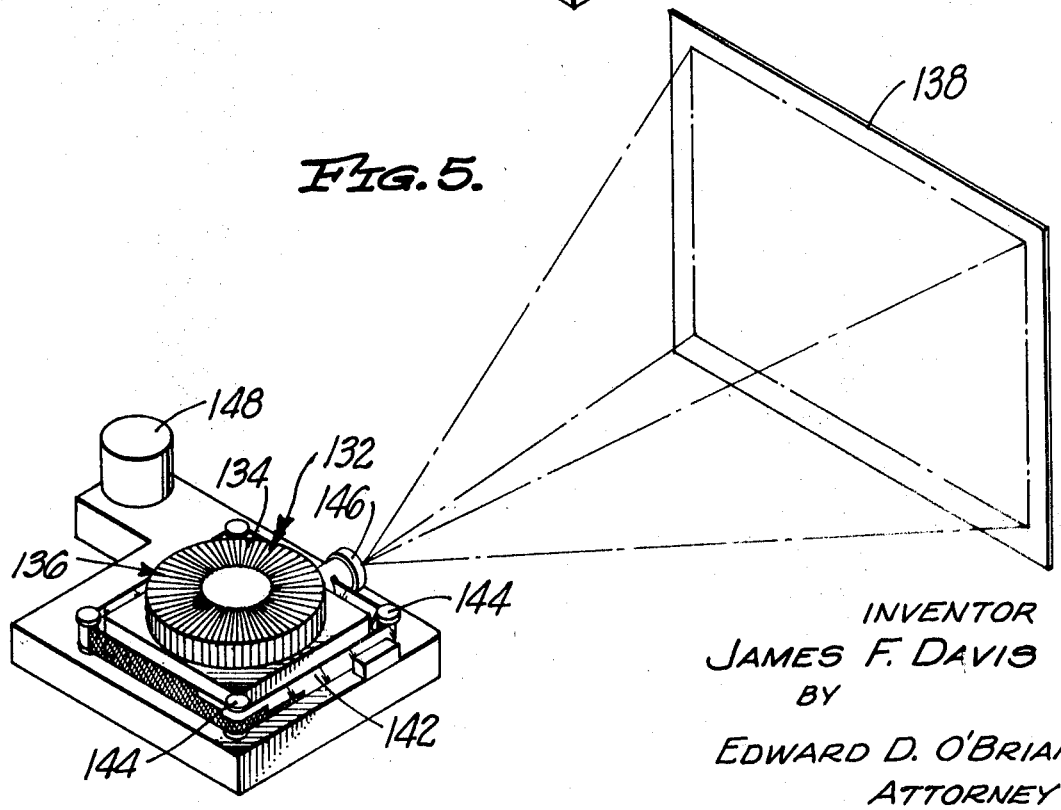
FIG. 5 is an isometric view, partially in diagrammatic form, showing a still different further modified illuminated sign of this invention.

In an embodiment of a sign of this invention 130 illustrated in FIG. 5 a conventional projector 132 corresponding to the projector 20 previously employed is used to project an image from any slide 134 of a series of slides held by a magazine 136 in the manner previously described directly upon a conventional viewing screen 138. The projector 132 may be mounted in any convenient location, as, for example, upon a platform 140 at one side of a room and the screen 138 may be mounted at the other side of the room.

With the projector 132 a transparent endless shutter belt 142 is mounted upon sprockets 144 on the platform 140 so as to pass in front of the lens system 146 of the projector 132. If desired this lens system 146 can be considered as an "optional means." This belt is normally continuously moved by a small motor 148 connected to one of the sprockets 144. The belt 142 has opaque means 149 corresponding to the areas 56, 58, 59 and 60 previously described.

It also carries a small opening 150 which is adapted to actuate the arm 152 of a conventional switch 154 so as to cause sequential operation of the projector 132 so as to cause the projection of successive slides, 134. Appropriate electric cords 156 are used to supply power to the projector 132, the motor 148 and the switch 154 for the purpose of controlling the operation of the mechanism described.

During the operation of the sign 130 a series of different images are sequentially projected onto the screen 138 as the belt 142 is moved. During such motion of the belt 142 as an area 149 blocks off the projected image this image is changed through the actuation of the switch 154, causing operation of the changing mechanism of the projector 132. By these means results are achieved which correspond to the results obtained with the previously described signs 10, 70, 80 and 120.

These signs of this invention are considered to be particularly advantageous as with them a series of different images such as views of scenery, different areas, or the like may be projected in such a manner that these views attract an individual's attention and yet are used in such a way that changing advertising messages are used in conjunction with them. It will be realized that this invention may be modified in various different ways without changing or departing from the type of action achieved with it. Thus, for example, the various projectors indicated may be interchanged and the types of belt shutters used with these can be modified in accordance with routine engineering skill. For these reasons the invention itself is to be considered as being limited solely by the appended claims forming a part of this disclosure.

I claim:

1. An illuminated sign which includes a housing having a front opening, a viewing screen located in said opening, said screen having a front and a back and such that an image projected on the back of said screen may be viewed from the front of said screen;
   projector means for illuminating an image, of one film frame of a series of film frames and for advancing said film frames so that different film frames are projected, said projector means being spaced from said screen;
   optical means for projecting an image illuminated by said projector means onto said viewing screen;
   shutter means for periodically intercepting at least part of an image illuminating by said projector means so that said intercepted part cannot be viewed on said viewing screen, said shutter means comprising an endless partly transparent belt, means for supporting said belt and means for continuously moving said belt, said belt having an opaque area extending completely across the width of said belt perpendicular to the direction of movement of said belt and having continuous, stepped opaque areas which extend partially across the width of said belt so that said belt is capable of displaying progressively a message contained on a single film frame being projected by said projection means; and
   cooperating actuating means, one of said cooperating means being on said shutter means for periodically causing said projector means to illuminate the next of said film frames of said series when no projected image is visible on said screen, the other of said cooperating means being connected to said projector means.

2. An illuminated sign as claimed in claim 1 wherein:
said belt extends in between said viewing screen and said projector means.

3. An illuminated sign as claimed in claim 1 wherein:
said belt extends in front of said viewing screen.

4. An illuminated sign as claimed in claim 1 wherein:
said optical means includes a lens means, said lens means having an opening therein which divides said lens system into sections, and
said belt extends through said opening.